(12) United States Patent
Komatsu (10) Patent No.: US 8,498,041 B2
(45) Date of Patent: Jul. 30, 2013

(54) ELECTROPHORETIC DISPLAY ELEMENT, ELECTROPHORETIC DISPLAY DEVICE, AND ELECTRONIC APPARATUS

(75) Inventor: Harunobu Komatsu, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 239 days.

(21) Appl. No.: 12/832,419

(22) Filed: Jul. 8, 2010

(65) Prior Publication Data

US 2011/0026098 A1 Feb. 3, 2011

(30) Foreign Application Priority Data

Jul. 29, 2009 (JP) ................................. 2009-176712
May 14, 2010 (JP) ................................. 2010-112057

(51) Int. Cl.
*G02B 26/00* (2006.01)
*G09G 3/34* (2006.01)

(52) U.S. Cl.
USPC ........................................... 359/296; 345/107

(58) Field of Classification Search
USPC ..................... 359/296; 345/107, 105; 430/32, 430/34, 38; 204/600, 450
See application file for complete search history.

(56) References Cited

U.S. PATENT DOCUMENTS

| | | | | |
|---|---|---|---|---|
| 3,612,758 A | * | 10/1971 | Evans et al. | 348/803 |
| 6,825,829 B1 | * | 11/2004 | Albert et al. | 345/107 |
| 6,844,958 B2 | * | 1/2005 | Kawai | 359/296 |
| 6,930,818 B1 | | 8/2005 | Liang et al. | |
| 2003/0231162 A1 | * | 12/2003 | Kishi | 345/107 |
| 2006/0072193 A1 | | 4/2006 | Johnson | |
| 2006/0119568 A1 | | 6/2006 | Ikeda | |
| 2007/0139358 A1 | * | 6/2007 | Sakamoto | 345/107 |
| 2009/0128889 A1 | | 5/2009 | Kawase et al. | |

FOREIGN PATENT DOCUMENTS

| | | |
|---|---|---|
| JP | A-2002-162650 | 6/2002 |
| JP | A-2004-4773 | 1/2004 |
| JP | A-2005-284234 | 10/2005 |
| JP | A-2005-536773 | 12/2005 |
| JP | A-2006-162969 | 6/2006 |
| JP | A-2009-128385 | 6/2009 |
| JP | A-2009-145873 | 7/2009 |
| JP | A-2009-237335 | 10/2009 |
| JP | A-2009-251048 | 10/2009 |

* cited by examiner

*Primary Examiner* — Tuyen Tra
(74) *Attorney, Agent, or Firm* — Oliff & Berridge, PLC (57) ABSTRACT

An electrophoretic display element includes: a cell containing first and second electrophoretic particles mutually oppositely charged with positive and negative polarities; and first and second electrode sections disposed opposite to each other across the cell in a viewing direction of the cell, wherein the first electrode section includes first and second electrodes whose application voltages are individually controlled, and the second electrode section includes third and fourth electrodes whose application voltages are individually controlled.

9 Claims, 9 Drawing Sheets

ELECTROPHORETIC DISPLAY ELEMENT, ELECTROPHORETIC DISPLAY DEVICE, AND ELECTRONIC APPARATUS

This application claims priority to Japanese patent applications No, 2009-176712 filed Jul. 29, 2009 and No. 2010-112057 filed May 14, 2010, and the said application is herein incorporated in the present specification.

BACKGROUND

1. Technical Field

The present invention relates to display technology that uses electrophoresis of charged particles in a solvent.

2. Related Art

It is generally known that, when an electric field is applied to a dispersion liquid in which charged particles are dispersed in a solvent (dispersion medium), the particles migrate (electrophoretically move) in the dispersion medium by a Coulomb force. This phenomenon is called electrophoresis. Electrophoretic display (EDP) devices that display desired information such as images using the electrophoresis are known.

A known example of such electrophoretic display devices includes a pair of substrates, multiple closed cells formed by dividing a space between the pair of substrates with partition walls, and a dispersion liquid containing charged particles (electrophoretic particles) and dispersion medium enclosed in each of the closed multiple cells. JP-A-2004-4773 and JP-A-2006-162969 describe examples of related art.

Each one of the cells of the EPD can be made to correspond with each of pixels, and a full color display can be achieved by arranging three different colors (for example, red, green and blue) to be correlated with each three of the cells. Such cells may be arranged to have a cell structure, for example, in which (1) white particles, black particles and color dispersion liquid are filled; (2) white particles, black particles and colored particles are filled; or (3) white particles and black particles are filled, and color filters are added.

According to the cell structures (1) and (2) described above, when a red color is to be displayed, the other two (i.e., green and blue) pixels other than the pixel displaying red are respectively controlled to be in a white or black displaying state. Specifically, in this case, the three pixels may be placed in a displaying state of (red, white and white), (red, white and black) or (red, black and black). When displaying a green color or a blue color, the remaining two pixels other than the pixel of a target color (single color) to be displayed are similarly arranged to be in a white or black displaying state.

As a method to control the cell display state, a method (a vertical type) in which the particles are electrophoretically moved in a direction perpendicular to a substrate surface (in other words, in a direction along the observer's viewing direction) by electrodes provided on the substrates that hold the cells is known. Another known method is a method (a horizontal type) in which the particles are electrophoretically moved in a direction perpendicular to a surface of the partition wall (in other words, in a direction parallel with the substrate surface) by electrodes provided on the partition walls that divide the cells.

When particles charged in positive and negative opposite polarities are mixed in the cells, the particles of positive and negative opposite polarities (hereafter, simply referred to as "opposite polarities") are mutually coupled in the process of electrophoresis of the particles in response to controlling of the display state (display color), which may cause aggregation and sedimentation of the particles, and lead to deterioration of the display performance of the EPD.

SUMMARY

In accordance with an advantage of some aspects of the invention, the display performance of an electrophoretic display device can be improved.

In accordance with other embodiments of the invention, it is also possible to provide effects that can only be derived from the composition of each of the embodiments of the invention to be described below, and that cannot be obtained by the conventional art.

An electrophoretic display element in accordance with an embodiment of the invention is equipped with a cell containing first and second electrophoretic particles mutually oppositely charged with positive and negative polarities, and first and second electrode sections disposed opposite to each other across the cell in a viewing direction of the cell, wherein the first electrode section is equipped with first and second electrodes whose application voltages are controlled individually from each other, and the second electrode section is equipped with third and fourth electrodes whose application voltages are controlled individually from each other. With such a structure, the voltages on the first through fourth electrodes are individually controlled, whereby electrophoretic paths of the first and second electrophoretic particles mutually oppositely charged with positive and negative polarities can be individually controlled according to the charge polarities of the first and second electrophoretic particles.

In accordance with an aspect of the invention, a polarity pattern of the voltages to be applied to the first through fourth electrodes may be controlled such that the first electrophoretic particles electrophoretically move within the cell in a first path in a direction along the viewing direction, and the second electrophoretic particles electrophoretically move within the cell in a second path different from the first path in a direction opposite to the viewing direction. As a result, the first and second electrophoretic particles can be electrophoretically moved in mutually opposite different directions within the cell.

Further, the first path may be a path that passes through a first space within the cell held between a pair of the first electrode and the third electrode, and the second path may be a path that passes through a second space within the cell held between a pair of the second electrode and the fourth electrode. As a result, the first and second electrophoretic particles can be electrophoretically moved in different paths spatially separated within the cell.

In accordance with another aspect of the invention, the first and third electrodes may be provided in regions corresponding to a peripheral region of the cell in a plan view as viewed in a direction along the viewing direction, respectively, and the second and fourth electrodes may be provided in a region corresponding to a central region excluding the peripheral region in the plan view. As a result, for example, the first electrophoretic particles can be electrophoretically moved in the path passing through the peripheral region within the cell, and the second electrophoretic particles can be electrophoretically moved in the path passing through the central region within the cell.

Also, surfaces of the first electrophoretic particles and an inner wall surface of the cell belonging to the first space may be hydrophilic. As a result, the first electrophoretic particles would more readily move in the first space by electrophoresis in a path along and adjacent to the hydrophilic inner wall surface.

In addition, surfaces of the second electrophoretic particles and an inner wall surface of the cell belonging to the second space may be hydrophobic. As a result, the second electrophoretic particles would, relatively, more readily be locally gathered to the hydrophobic inner wall in the second space.

Also, the first electrophoretic particles may be first colored particles corresponding to one of the primary colors in additive color mixing or subtractive color mixing, and the second electrophoretic particles may be second colored particles in a complementary relation with the first colored particles. By this, color display can be made with the colored particles, and mixed color display can also be made, using different color particles with complementary colors in different cells.

Moreover, the cell may further include white particles having the same polarity as that of the second electrophoretic particles, and having a smaller charge amount than that of the first and second electrophoretic particles. As a result, three different colors can be displayed by each one of the cells, whereby types of display colors can be broadened.

Furthermore, the controlling of the polarity pattern of voltages may include a control of shifting the voltage application timings between applications of voltages to different electrodes belonging to the same electrode section. As a result, the first or second electrophoretic particles may be unevenly distributed adjacent to one of the specified electrodes, and then electrophoretically moved (dispersed) toward and close to the other electrode belonging to the same electrode section.

Moreover, an electrophoretic display device in accordance with an embodiment of the invention is equipped with the electrophoretic display element and a control circuit that controls the pattern of voltage polarities. This makes it possible to realize an electrophoretic display device that is capable of individually controlling the electrophoretic paths described above.

Also, an electronic apparatus in accordance with an embodiment of the invention is equipped with the electrophoretic display device described above. This makes it possible to realize an electronic apparatus that is capable of individually controlling the electrophoretic paths described above.

DESCRIPTION OF EXEMPLARY EMBODIMENTS

Preferred embodiments of the invention are described below with reference to the accompanying drawings. It is noted that embodiments to be described below are exemplary illustrations, and are not intended to exclude applications of various modifications and technology that are not explicitly stated hereunder. In other words, the invention can be implemented with various modifications (through combining the embodiments and the like) within the range that does not depart from the subject matter. In the descriptions of the drawings, identical or similar components are appended with identical or similar reference numerals. The drawings are schematic presentations, and do not necessarily match with the actual measurements or ratios. The drawings may contain portions that are mutually different in their measurement relations and ratios.

Embodiment

Figure 1:
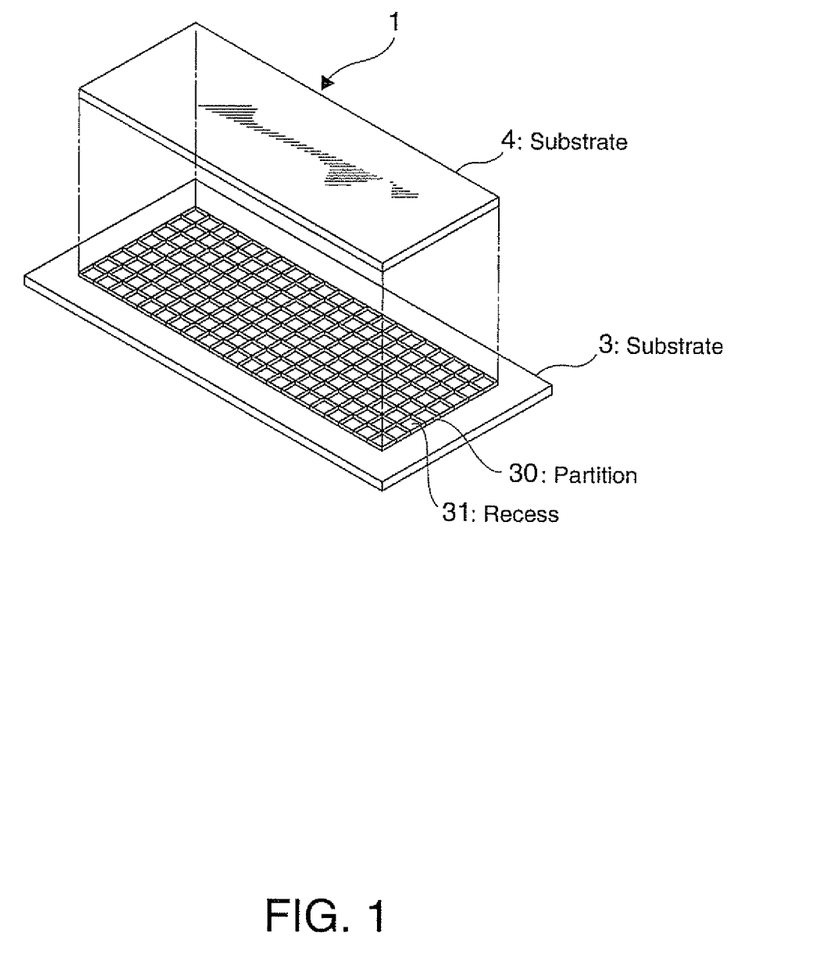
FIG. 1 is an exploded perspective view schematically showing an electrophoretic display device in accordance with an embodiment of the invention.
Figure 2:
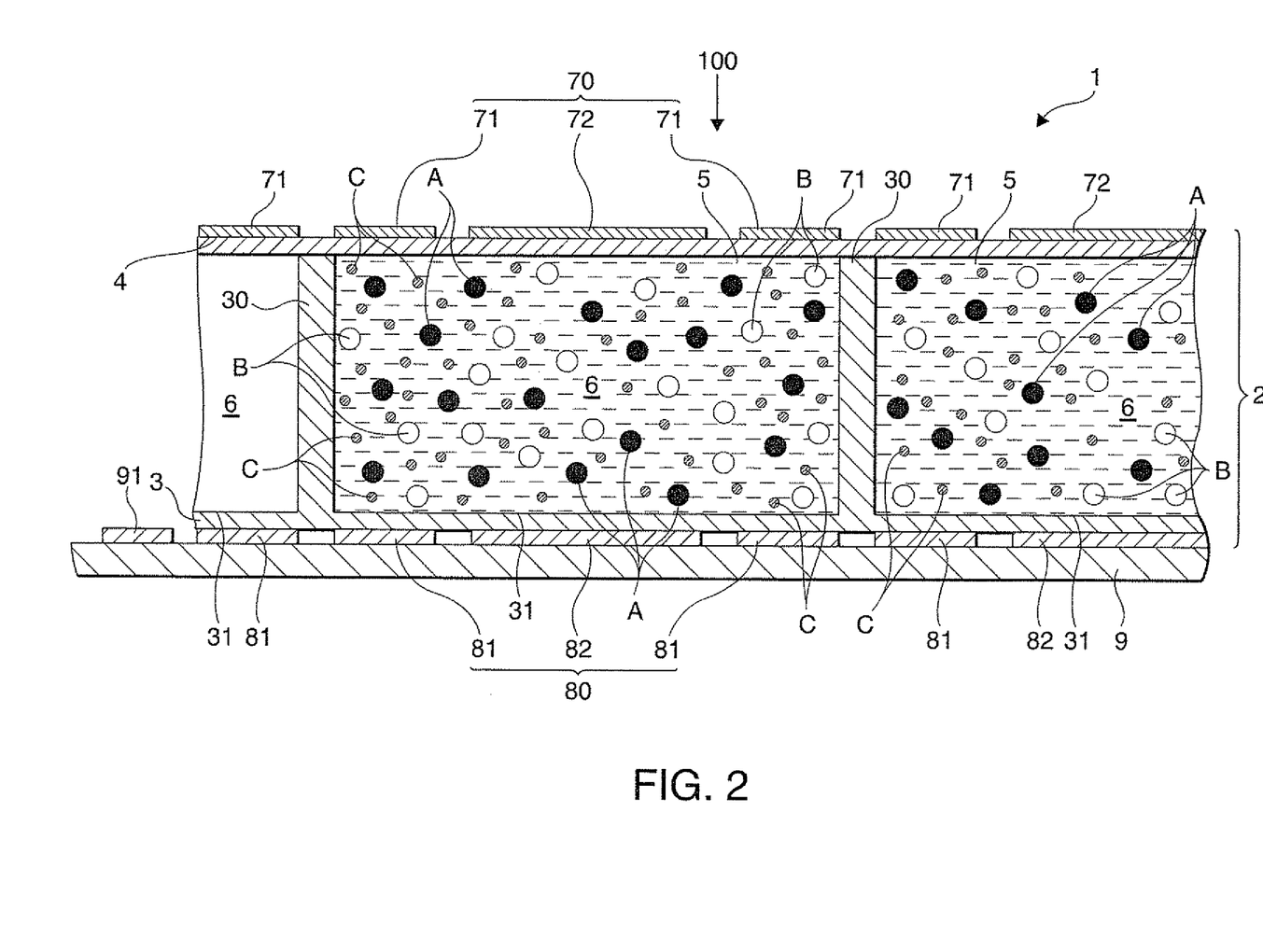
FIG. 2 is a schematic cross-sectional view in part of the electrophoretic display device exemplified in FIG. 1.
Figure 3:
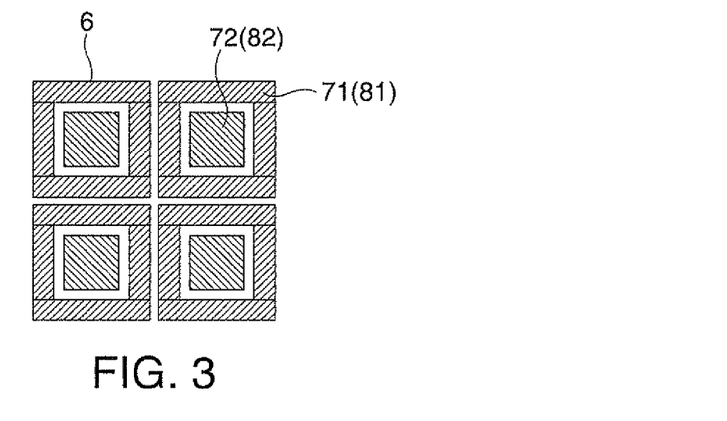
FIG. 3 is a plan view showing an example of the configuration and arrangement of electrodes of the electrophoretic display device exemplified in FIG. 1 and FIG. 2.

FIG. 1 is an exploded perspective view schematically showing an electrophoretic display device 1 in accordance with an embodiment of the invention. FIG. 2 is a schematic cross-sectional view in part of the electrophoretic display device 1 exemplified in FIG. 1. FIG. 3 is a plan view showing an example of the shape and arrangement of electrodes of the electrophoretic display device 1 exemplified in FIG. 1 and FIG. 2. An arrow 100 shown in FIG. 2 represents a viewing direction of an observer who is looking at the electrophoretic display device 1, and FIG. 3 corresponds to a plan view as viewed at a plane in the viewing direction 100.

As shown in FIG. 1 and FIG. 2, the electrophoretic display device 1 in accordance with the present embodiment is equipped with, for example, a substrate 3, a plurality of recesses 31 spatially divided by a plurality of partitions 30 on one surface of the substrate 3, and a substrate 4 bonded to each of the partitions 30 in a manner to cover opening sections of the recesses 31.

The partitions 30 may be obtained by forming wall sections (protrusions) having a predetermined patter on one surface of the substrate 3. As the method of forming such protrusions, for example, an ink jet method (a droplet ejection method), a printing method such as a screen printing method, a gravure printing method, a nanoimprint method and the like, a photolithography method and the like may be used. As another example, the partitions 30 can also be formed through forming a layer of material for forming the protrusions on the substrate 3, and then performing mechanical, physical or chemical etching, or performing mechanical processing with laser, embossing or the like, or blasting treatment on the layer according to a predetermined pattern.

As a constituent material of the partitions 30, for example, various kinds of resin materials, such as, epoxy-based resin, acryl-based resin, urethane-based resin, melamine-based resin and phenol-based resin; and various kinds of ceramics materials, such as, silica, alumina, titania ceramics and the like can be enumerated. One or more types selected from among these materials may be used. As a non-limiting example, permanent photoresist TMMR S2000 for MEMS manufactured by Tokyo Ohka Kogyo Co., Ltd may be used. An average height of the partitions 30 in a direction perpendicular to the substrate 30, in other words, the distance between the substrates 3 and 4, may be about 10-500 µm, as an example without any particular limitation.

The closed spaces 6 formed by internal walls of the recesses 31 and the substrate 4 are called cells, and a solution (dispersion liquid) 5 in which particles A-C are dispersed (suspended) in a predetermined solvent (dispersion medium) is sealed in each of the cells 6. A task of dispersing the particles A-C in the dispersion medium may be performed by using one or a combination of two or more of, for example, a paint shaker method, a ball mill method, a media mill method, an ultrasonic dispersion method and a stirrer dispersion method.

Each of the cells 6 may be made to correspond to a single pixel. For example, when performing a full-color display, each three of the cells 6 may be made to correspond to three different colors, respectively. As the different three colors, three primary colors (red, green and blue) in additive color mixing or three primary colors (cyan, magenta and yellow) in subtractive color mixing that are in complementary color relation with the aforementioned three primary colors may be used.

Each of the cells 6 may have any shape, such as, for example, a triangle, a quadrilateral, a hexagon, a circle, an oval or the like in a plan view in the viewing direction 100. For example, each of the cells 6 may be formed in a hexagonal shape, thereby forming a cell pattern in a honeycomb configuration. As a result, the mechanical strength of a display section (an electrophoretic display element 2) can be improved.

Two electrodes 81 and 82 are provided for each of the cells on another surface side of the substrate 3 (on the side viewable in a direction against the viewing direction 100), and two electrodes 71 and 72 are provided for each of the cells on a surface of the substrate 4 on the side that is viewable in the viewing direction 100. In other words, the four electrodes 71, 72, 81 and 82 in total are provided for each of the cells 6.

For the convenience of description, the first and second electrodes 71 and 72 viewable in the viewing direction 100 in FIG. 2 may be referred to as "front surface electrodes" and the third and fourth electrodes 81 and 82 on the opposite side of the viewable side in the viewing direction 100 may be referred to as "back surface electrodes." The front surface electrodes 71 and 72 define a first electrode section 70, and the back surface electrodes 81 and 82 define a second electrode section 80 that is opposite to the first electrode section 70 across the cells 6 in the viewing direction 100.

The substrate 3, the substrate 4, the cells 6, the electrodes 71, 72, 81 and 82 form an electrophoretic display element 2 that functions as a display section of the electrophoretic display device 1. The electrophoretic display element 2 can include, conceptually, an EPD panel or an EPD sheet, for example.

As the substrate 4 and the front surface electrodes 71 and 72 viewable in the viewing direction 100, a transparent substrate and transparent electrodes that transmit light in the wavelength region of visible light may be used, for allowing visual recognition of the interior of the cells 6 that correspond to pixels.

As the material for the transparent substrate and for the transparent electrodes, any material substantially having conductivity can be used. Non-limiting examples of such conductive materials include metallic materials such as copper, aluminum, and alloys thereof; carbon materials such as carbon black; electron-conductive polymeric materials such as polyacetylene, polypyrrole, and derivatives thereof; ion-conductive polymeric materials prepared by dispersing an ionic material such as NaCl, $LiClO_4$, KCl, LiBr, $LiNO_3$, LiSCN or the like in a matrix resin such as polyvinyl alcohol, polycarbonate, polyethylene oxide or the like; and conductive oxide materials such as indium tin oxide (ITO), fluorine-doped tin oxide (FTO), tin oxide ($SnO_2$), and indium oxide (IO). These conductive materials may be used alone or in combinations of two or more materials. As a non-limiting embodiment example of the transparent electrode, PET/ITO sheet NXC1 manufactured by Toray Co., Ltd. may be used. It is noted that materials similar to the above may be used for the electrodes 81 and 82.

The back surface electrodes 81 and 82 may be formed on one surface of a circuit substrate 9. In addition to the back surface electrodes 81 and 82, the circuit substrate 9 may also be provided with an electric circuit (illustration omitted) including, for example, thin film transistors (TFTs) that function as switching elements, a control circuit 91 that controls voltages to be applied to the electrodes 71, 72, 81 and 82, and the like. The control circuit 91 is electrically connected to the electrodes 71, 72, 81 and 82, respectively, and is capable of individually controlling the magnitude and the polarity (positive or negative) of each of the voltages to be applied.

The substrate 3, the substrate 4 and the partitions 30 have, for example, electrical insulation property and impermeability (retention property) against the dispersion liquid sealed inside the cells 6. The substrate 3, the substrate 4 and the partitions 30 may be formed from glass substrates, or flexible sheet members. By the use of flexible sheet members as the substrates 3 and 4, a freely deformable display section, such as, for example, an electronic paper can be obtained. As a material of the flexible sheet member, for example, polyolefin, liquid crystal polymer and thermoplastic elastomer, and copolymers, blends or polymer alloys mainly constituted of the aforementioned materials may be used. One or more of these materials may be used independently or in combination. The thickness of the sheet member can be arbitrarily set, while balancing between its flexibility and strength as an EPD, and may be about 20-500 µm, as an example without any particular limitation.

Configuration and Arrangement of Electrodes

One of the front surface electrodes 71 on the substrate 4 may be provided in a manner to extend in a ring shape along the peripheral region of the cell 6, when the electrophoretic display device 1 is viewed in the viewing direction 100 in FIG. 2, as exemplified in FIG. 3. The electrode 71 may be formed in a shape corresponding to the shape of the cell as viewed in the viewing direction 100. On the other hand, the other front surface electrode 72 on the side of the substrate 4 may be provided in a central area of the cell 6 in a manner to be surrounded by the front surface electrode 71 in the circular shape, as viewed in the viewing direction 100.

Similarly, the back surface electrode 81 provided on the side of the substrate 3 may also have a configuration and an arrangement, for example, similar to those of the front surface electrode 71 across the cell 6. Also, the other back surface electrode 82 may also have a configuration and an arrangement, for example, similar to those of the front surface electrode 72 across the cell 6. In other words, as the electrophoretic display device 1 is viewed from the side of the circuit substrate 9, the back surface electrode 81 may be provided in a manner to extend along the peripheral region of the cell 6 in a ring shape. Also, as the electrophoretic display device 1 is viewed from the side of the circuit substrate 9, the back surface electrode 82 may be provided in a central region of the cell 6 in a manner to be surrounded by the electrode 81 in the ring shape. However, the electrode 71 and the electrode 81 (the electrode 72 and the electrode 82) may not have to be identical to each other in configuration and arrangement, and may have different shapes in a range permissible, for example, in terms of the controllability of electrophoretic paths within the cell 6 to be described below.

Figure 4:
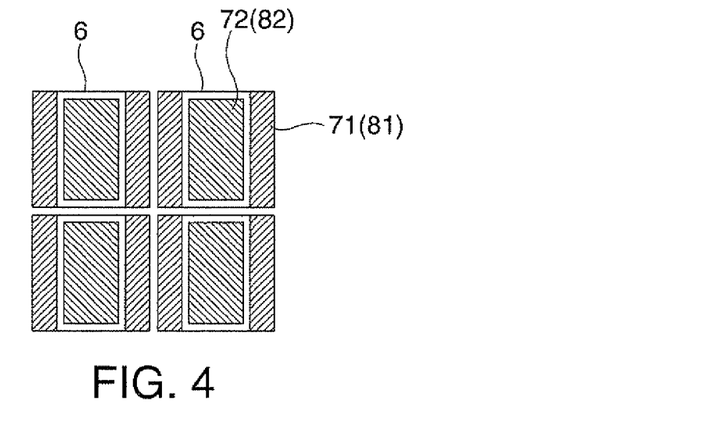
FIG. 4 is a plan view showing a modified example of the configuration and arrangement of electrodes for each cell exemplified in FIG. 3.
Figure 5:
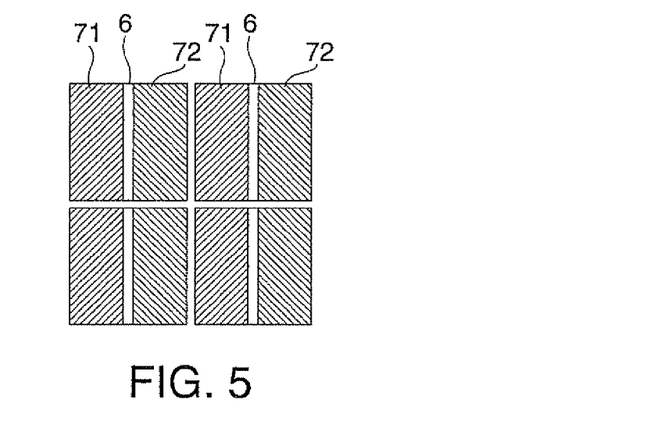
FIG. 5 is a plan view showing another modified example of the configuration and arrangement of electrodes for each cell exemplified in FIG. 3.

The configuration and arrangement of the electrodes 71, 72, 81 and 82 are not limited to those shown in FIG. 3. For example, the configurations and arrangements shown in FIG. 4 and FIG. 5 may also be used. FIG. 4 and FIG. 5 are schematic plan views in part of the electrophoretic display device 1, both of which correspond to FIG. 3.

The example shown in FIG. 5 is provided with strips of front surface electrode 71, each having a constant width, extending along two opposing sides of a rectangular cell 6 as viewed in a plane in the viewing direction 100, and a strip of front surface electrode 72 having a constant width and extending in parallel with the electrodes 71 provided in an area between the electrodes 71. Back surface electrodes 81 and 82 to be provided on the side of the substrate 3 may also have a configuration and an arrangement similar to those of the front surface electrodes 71 and 72. The width (area) of the electrode 72 (82) may be set to be greater than the width (area) of the electrode 71 (81) as exemplified in FIG. 5. However, they can be set without any particular limitation to the above.

In the case of the electrode configuration and arrangement exemplified in FIG. 3 or FIG. 4, the electrode 71 may be referred to, for the sake of convenience, as the "front surface center electrode," and the electrode 72 may be referred to as the "front surface peripheral electrode" in terms of their relative positions. Also, the electrode 81 on the side of the substrate 3, on the side opposite to the viewable side, may be referred to as the "back surface center electrode," and the electrode 82 may be referred to as the "back surface peripheral electrode."

In the case of the example shown in FIG. 5, the front surface electrodes 71 and 72 are provided to correspond respectively to halved regions of an area of each of the cells 6 having a quadrilateral shape, as viewed in a plan in the viewing direction 100. The back surface electrodes 81 and 82 on the side of the substrate 3 may have similar configuration and arrangement. It is noted that the areas of the electrodes 71 and 72 may be equal to or different from each other.

In any of the cases shown in FIG. 3, FIG. 4 and FIG. 5, the front surface electrodes 71 and 72 as well as the back surface electrodes 81 and 82 are mutually spatially separated, thereby being electrically insulated from each other, and application of voltage to each of the electrodes 71, 72, 81 and 82 is individually (independently) controlled by the control circuit 91. The voltage control includes controlling of the magnitude and the polarity (positive or negative) of each application voltage.

By controlling the magnitude of the application voltage, electrophoretic speed of the electrophoretic particles within the cells 6 shown in FIG. 2 can be controlled. By controlling the polarity of the application voltage, the electrophoretic particles within the cells 6 may be locally gathered to the side of the substrate 4 that is the viewing side, or locally gathered to the side of the substrate 3 that is a side opposite to the viewing side.

Furthermore, with the electrode configuration and arrangement exemplified in each of FIG. 3, FIG. 4 and FIG. 5, the pattern of polarities of voltages (positive and negative voltages) to be applied to each of the electrodes 71, 72, 81 and 82 is controlled, whereby the electrophoretic path of the electrophoretic particles may be locally shifted to different regions within the cells 6 according to the polarity (positive or negative charge) of the electrophoretic particles.

For example, it is possible to perform a control (an electrophoretic path control) in which the first particles having a positive or negative charge polarity may be moved by electrophoresis in a first path passing through a first region (for example, the peripheral region) of the cell 6 shown in FIG. 2, in a direction along the viewing direction 100, and the second particles having an opposite polarity may be moved by electrophoresis in a second path passing through the second region (for example, the central region) of the cell 6 shown in FIG. 2, in the opposite direction of the first particles.

It is noted that the "peripheral region" of the cell 6 may be defined as a "first" space interposed between a pair of the front surface electrode 71 and the back surface electrode 81, and the "central region" may be defined as a "second" space interposed between a pair of the front surface electrode 72 and the back surface electrode 82. In this case, the surface of the partition 30 defining an inner wall of the cell 6 belongs to the peripheral region that is an example of the first space, and the surface of the substrate 3 and 4 defining an inner wall of the cell 6 belongs to the central region that is an example of the second space. Hydrophilic sections or hydrophobic sections in a pattern corresponding to the electrode configuration and arrangement can be provided on these surfaces, as described below.

Dispersion Liquid

Next, the dispersion liquid 5 sealed in the cells 6 shown in FIG. 2 is described.

Each of the cells 6 is filled with a solution (dispersion liquid) 5 in which electrophoretic particles (A-C in the example shown in FIG. 2) are dispersed (suspended) in a predetermined solvent (dispersion medium) and sealed. As a method of filling the dispersion liquid 5 in the cells 6 (the recesses 31), various coating methods, for example, a dipping method of dipping the substrate 3 having the recesses 31 in the dispersion liquid 5, a dripping method using a disperser, an ink jet method (a droplet ejection method), a spin coat method, a dip coat method, a spray coat method and the like may be used. The use of a dripping method or an ink jet method allows selective supply of the dispersion liquid 5 to target cells 6. Therefore, the dispersion liquid 6 can be reliably supplied in the cells 6 without any wastes. It is noted that the direction in which the dispersion liquid 5 is supplied to each of the cells 6 is not necessarily limited to the vertical downward direction, and may be sideway or in a vertical upward direction.

As the dispersing medium, for example, it is possible to use alcohols such as methanole; ellosolves such as methyl cellosolve; esters such as methyl acetate; ketones such as acetone; aliphatic hydrocarbons (liquid paraffins) such as pentane; alicyclic hydrocarbons such as cyclohexane; aromatic hydrocarbons such as benzene; halogenated hydrocarbons such as methylene chloride; aromatic heterocycles such as pyridine; nitrites such as acetonitrile; amides such as N,N-dimethylformamide; carboxylic salts; various kinds of oils; and the like. One or more of them may be used independently or in combination.

Above all, a dispersion medium made of aliphatic hydrocarbons (liquid paraffin) as the principal component is preferable. The dispersion medium primarily containing liquid paraffin is preferable since it has high aggregation suppressing effect on the electrophoretic particles, and relatively low affinity (low solubility) to the constituent material of the cells 6. Accordingly, the display performance of the EPD can be more securely prevented or suppressed from deteriorating with time. Further, liquid paraffin is preferable also in view of the fact that it has excellent weather-resistant property because it does not include unsaturated bonds, and is highly safe.

Further, if necessary, various kinds of additives may be added to the dispersion medium. For example, it is possible to add a surfactant (anionic or cationic surfactant) such as electrolyte, alkenyl succinate or the like; a charge-controlling agent composed of particles of a metal soap, a resin material, a rubber material, an oil, a varnish or a compound; a dispersion agent such as a silane-based coupling agent; a lubricating agent; a stabilizing agent; and the like.

Further, when the dispersion medium is to be colored, depending on the necessity, a pigment, such as, an anthraquinone-based pigment, an azo-based pigment, an indigoid-based pigment or the like may be dissolved in the dispersion medium.

Above all, if the dispersion liquids 5 with different compositions are selectively supplied to the cells 6 by a dispenser or the like, hydrocarbon medium having high viscosity, such as, Isopar M, Isopar G and the like may be suitable.

Electrophoretic Particles

Plural kinds of electrophoretic particles may be contained in the dispersion liquid 5. FIG. 2 shows a state in which three kinds of particles A, B and C are contained in the dispersion liquid 5.

As the particles A-C described above, for example, at least one type of pigment particles, resin particles and composite particles thereof may preferably be used.

As a pigment of which the pigment particles are made, for example, it is possible to use: a black pigment such as aniline black or carbon black; a white pigment such as titanium oxide or antimony oxide; an azo-based pigment such as monoazo, disazo or polyazo; a yellow pigment such as isoindolinone, chrome yellow or iron oxide yellow; a red pigment such as quinacridone red or chrome vermilion; a blue pigment such as phthalocyanine blue or indanthrene blue; a green pigment such as phthalocyanine green; and the like. One or a combination of two or more of these pigments may be used.

Also, as a resin material that composes the resin particles, for examples, acryl-based resin, urethane-based resin, urea-based resin, epoxy-based resin, polystyrene, polyester and the like can be enumerated. One or a combination of two or more of these resin materials may be used. As the composite particles, for example, particles produced by coating surfaces of the pigment particles with the resin material or other pigment; particles produced by coating surfaces of the resin particles with the pigment; and particles made of a mixture obtained by mixing the pigment and the resin material in a suitable composition ratio can be enumerated. The aforementioned particles are advantageous because they can be readily manufactured, and their charge can be relatively easily controlled.

As the particles produced by coating the surfaces of the pigment particles with the other pigment, for example, particles obtained by coating surfaces of titanium oxide particles with silicon oxide or aluminum oxide can be exemplified. These particles may be used as white particles. Also, carbon black particles or particles produced by coating surfaces thereof may be used as color particles (black particles).

The average particle size of the electrophoretic particles A-C may be appropriately selected in a range that provides sufficient hiding ratio (display contrast) in a visible light region, but does not deteriorate the display quality due to facilitated sedimentation of the particles A-C. The average particle size of the electrophoretic particles A-C that satisfies such a range as described above may be between about 0.1 μm and about 10 μm, without any particular limitation to this range.

Moreover, the particles A and B may be charged particles having mutually opposite polarities. For example, the particles A may be positively charged particles that are electrically charged in positive polarity (+), and the particles B may be negatively charged particles that are electrically charged in negative polarity (−).

In contrast, each of the particles C may be very weakly charged particles having a sufficiently lower electrical charge than that of each of the particles A and B, or electrically non-charged particles that substantially do not have any polarity. In this case, the particles C may not be influenced or may be difficult to be influenced by electric fields applied by the electrodes 71, 72, 81 and 82, such that the particles C have a tendency to evenly disperse in the dispersion liquid 5. It is noted that, when the particles C are very weakly charged particles, the polarity of the particles C may be in the same polarity as that of either the particles A or B.

The positively charged electrophoretic particles A are particles having a positive charge, and therefore move by electrophoresis toward any of the four electrodes 71, 72, 81 and 82 to which a negative voltage is applied as if they were to be adsorbed (adhered) thereto. In contrast, the negatively charged electrophoretic particles B are particles having a negative charge, and therefore move by electrophoresis toward any of the four electrodes 71, 72, 81 and 82 to which a positive voltage is applied as if they were to be adsorbed thereto.

Therefore, by controlling patterns of the polarities of voltages to be applied to the electrodes 71, 72, 81 and 82, the charged particles A and B can be locally gathered in regions (spaces) in the cell 6 corresponding to appropriate ones of the four electrodes 71, 72, 81 and 82. In this manner, the electrophoretic display device 1 is capable of changing the color (hereafter also referred to as the "display color") within the cell 6 viewed in the viewing direction 100. Also, by controlling the pattern of voltage polarities, the electrophoretic paths, within the cell 6, of the particles A and B charged in mutually opposite polarities can be individually controlled. Accordingly, when switching the display color, the charged particles A and B may be electrophoretically moved in mutually different paths between the substrate 3 and the substrate 4, such that the probability of mutual collision (coupling) can be reduced. The control of electrophoretic paths will be described in greater detail below.

A part or all of the particles A-C may be in different colors. The colors of the particles A-C may be arbitrarily selected from among, for example, achromatic colors such as white (W), black and their halftone (gray), and chromatic colors such as three primary colors of red (R), green (G) and blue (B) in additive color mixing, and three primary colors of cyan (Cy), magenta (Ma) and yellow (Ye) in subtractive color mixing.

Also, combinations of polarities of the particles (positive/negative/non-charged) and colors of the particles may be arbitrarily selected. For example, it is possible to use a combination in which the particles C that are very weakly charged or non-charged may be assigned to white particles, the particles A that are positively charged may be assigned to one of the RGB colors, and the particles B that are negatively charged may be assigned to one of cyan (Cy), magenta (Ma) and yellow (Ye) respectively corresponding to complementary colors of R, G and B.

By using the two colored particles A and B in mutually complementary relation and the white particles C, three types of colors can be displayed by each cell, whereby the types of display colors can be broadened. In other words, the cell 6 (the dispersion liquid 5) may be composed of a combination of "white particles C+color particles A+particles B of a complementary color to the color particles A+colorless solvent."

For example, in a first cell 6, when the "color particles A" are red (R) particles, complementary color particles of the red particles are cyan (Cy) particles. Therefore the dispersion liquid 5 containing white (W) particles, red particles, and cyan particles is sealed in the first cell 6. In a second another cell 6, when the "color particles A" are green (G) particles, complementary color particles of the green particles are magenta (Ma) particles. Therefore the dispersion liquid 5 containing white particles, green particles and magenta particles is sealed in the second cell 6. Similarly, in a third another cell 6, when the "color particles A" are blue (B) particles, complementary color particles of the blue particles are yellow (Ye) particles. Therefore the dispersion liquid 5 containing white particles, blue particles and yellow particles is sealed in the third cell 6.

In summary, as the dispersion liquid 5 in the cell 6, as exemplified in Table 1 below, any of the three types of compositions #1-#3 can be selected. By combinations of the display colors of the cells 6 with these three types of compositions #1-#3, a full color display can be performed.

TABLE 1

Composition Examples of Dispersion Liquid 5

| | Color Particles A | Complementary color particles B | Particles C | Solvent |
|---|---|---|---|---|
| Composition #1 | Red (R) | Cyan (Cy) | White (W) | Colorless |
| Composition #2 | Green (G) | Magenta (Ma) | White (W) | Colorless |
| Composition #3 | Blue (B) | Yellow (Ye) | White (W) | Colorless |

For example, one of the cells 6 with one composition #i (i=1, 2 or 3) is controlled to display a color by the color particles A (R, G or B), and the cells 6 with the remaining two compositions #j=1, 2 or 3, and j≠i) are controlled to display a color by the complementary color particles B of two of the complementary colors (cyan, magenta and yellow). In this case, the display color (two colors in complementary color system) for the two cells (two pixels) is equivalent to displaying one of the three primary colors RGB. Accordingly, one of the three primary colors RGB can be displayed with three pixels.

For example, the cell 6 with the composition #1 is controlled to display a red color with the red particles A, and the two cells 6 with the compositions #2 and #3 are controlled to display magenta and yellow, respectively. In this instance, a mixed color of magenta and yellow is equivalent to displaying a red color as observed in the viewing direction 100. As to the other colors, a target color can also be displayed in a similar manner, using the color area for three pixels. Therefore, the chroma of target display colors can be improved.

Surface State of Particles

A polymer having high compatibility with the dispersion medium can be physically adsorbed or chemically bonded to the surfaces of the particles A-C. By so doing, dispersability of the particles A-C in the dispersion medium can be improved. Above all, from the point of view of separation or bonding of the polymer from or to the surfaces of the particles, it is preferred that the polymer is chemically bonded to the surfaces of the particles. Due to such bonding, an apparent specific gravity of the particles A-C work in a reducing direction, whereby it is possible to improve affinity, in other words, dispersibility of the particles A-C to the dispersion medium. The particles C may have better dispersability in the dispersion liquid 5, compared to the charged particles A and B. This can prevent the particles C from getting mutually aggregated and settling in the dispersion liquid 5. As a result, generation of color irregularities in a color display state can be prevented, whereby the color display characteristics can be improved.

Examples of such a polymer include: a polymer which has groups reacting with the electrophoretic particles and functional groups having charge property; a polymer which has groups reacting with the electrophoretic particles and long alkyl chains, long ethylene oxide chains, long alkyl fluoride chains, or long dimethyl silicone chains; and a polymer which has groups reacting with the electrophoretic particles, functional groups having charge property, and long alkyl chains, long ethylene oxide chains, long alkyl fluoride chains, or long dimethyl silicone chains; and the like.

Among the polymers described above, examples of the groups reacting with the particles A-C (hereinafter, referred to as "reactive groups") include epoxy groups, thioepoxy groups, alkoxysilane groups, silanol groups, alkylamido groups, aziridine groups, oxazin groups, isocyanate groups, and the like. One or more of these reactive groups may be used independently or in combination. These reactive groups may be appropriately selected depending on the kinds of the particles A-C.

However, the surface states of the charged particles A and B may be treated to exhibit mutually opposite properties with respect to water (hydrophilic or hydrophobic). For example, the surface state of the charged particles A may be made to be hydrophilic, and the surface state of the charged particles B may be made to be hydrophobic. In addition to these particle properties, a hydrophilic section and a hydrophobic section may be provided in the cell 6. For example, a hydrophilic section may be provided on the inner wall of the cell 6 in a pattern according to the configuration and arrangement of the electrodes 71, 72, 81 and 82, whereby the hydrophilic particles A, relatively, strongly act with the hydrophilic section, and would be locally distributed adjacent to the hydrophilic section or more readily electrophoretically move along and adjacent to the hydrophilic section.

Therefore, combined with the voltage polarity pattern control described above, the controllability of electrophoretic paths can be improved. As a result, when switching the display color, the probability of mutual collision (coupling) between the oppositely charged (positively and negatively charged) particles A and B can be further reduced, compared to the case where the hydrophilic section and/or hydrophobic section are not added to the inner wall of the cell 6.

Hydrophilic Section/Hydrophobic Section in Cell 6

Figure 6:
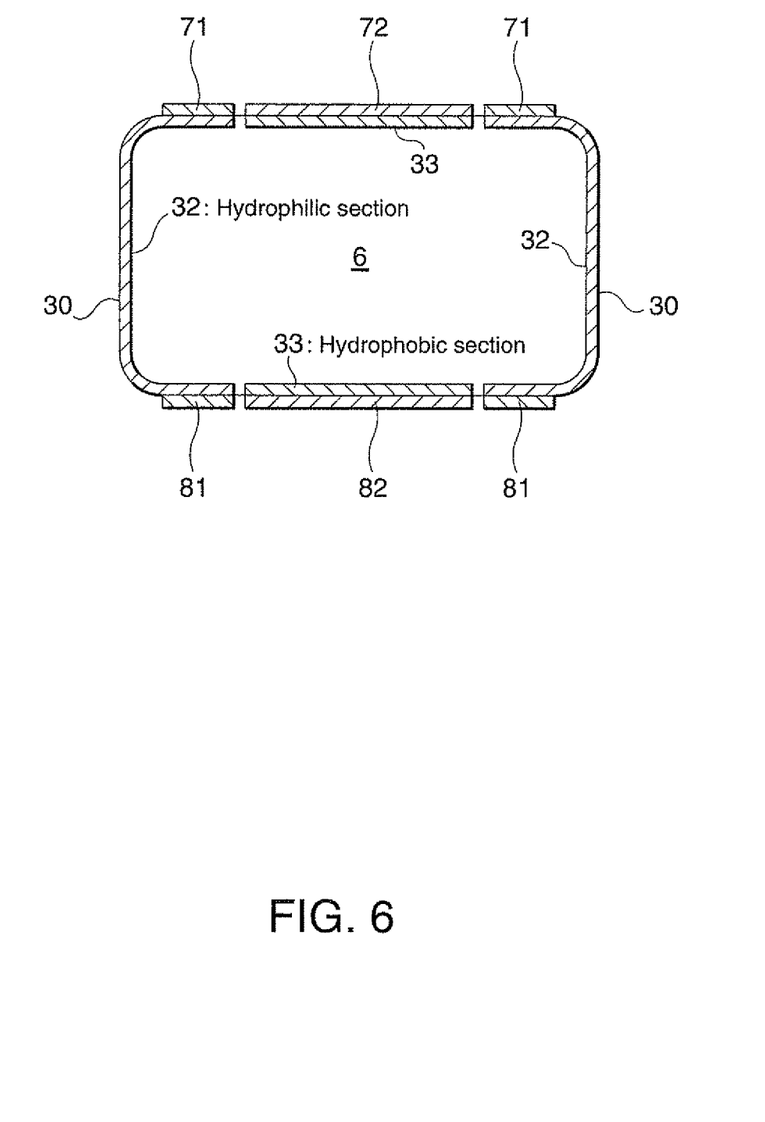
FIG. 6 is a cross-sectional view schematically showing a part of the electrophoretic display element exemplified in FIG. 2, focusing on one of the cells.

FIG. 6 is a schematic cross-sectional view in part of one of the cells of the electrophoretic display element 2, and shows an example in which a hydrophilic section 32 and a hydrophobic section 33 are provided on the inner wall of the cell 6. It is noted that the electrode configuration and arrangement are generally the same as those exemplified in FIG. 3 or FIG. 4. Also, in FIG. 6, illustration of cross sections of the substrate 3, the substrate 4 and the partition wall 30 is omitted, because the figure is intended only to show relative positional relation between the electrodes 71, 72, 81 and 82 and the inner walls of the cell 6 (which similarly apply to FIG. 7 and FIG. 8).

As illustrated in FIG. 6, the hydrophilic section 32 is provided on the inner wall portion of the cell 6 in an area extending from positions where the front surface peripheral electrode 71 on the side of the substrate 4 (the viewing side) and the back surface peripheral electrode 81 on the side of the substrate 3 are provided, respectively, toward the partition wall 30. The hydrophobic section 33 is provided on the inner wall portion of the cell 6 at an area corresponding to each of the front surface center electrode 72 and the back surface center electrode 82. In this case, the surface of the partition wall 30 that defines the inner wall surface of the cell 6 belongs to the peripheral region of the cell 6 where the hydrophilic section 32 is provided, and the surface of each of the substrate 3 and the substrate 4 that defines the inner wall surface of the cell 6 belongs to the central region of the cell 6 where the hydrophobic section 32 is provided.

The following method may be used as an example of the method for forming the hydrophilic section 32 on the inner wall of the cell 6. First, a portion of the inner wall surface of the cell 6 where the hydrophilic section 32 is to be provided is irradiated with oxygen plasma or ultraviolet light to make that portion to be hydrophilized. In this instance, an appropriate mask may be used to prevent irradiation of oxygen plasma or ultraviolet light on another portion of the inner wall of the cell 6 where the hydrophobic section 33 is to be formed.

Thereafter, organic silane compound, organic metal compound or ceramics precursor in gas phase is deposited on the hydrophilized inner wall surface, thereby forming a film of 0.5-500 nm thick thereon. Then, by irradiating plasma or ultraviolet light to the film, impurities such as carbon and the like in the film are removed, and the film is chemically changed to a ceramics thin film in near room temperature.

This makes it possible to form the hydrophilic section 32 that is capable of retaining its initial hydrophilic property even when it is left in the air atmosphere or water for a long time. Also, the adhesion between the inner wall of the cell 6 and the functional film formed on its surface can be improved. Accordingly, the probability of the hydrophilic section 32 being separated from the inner wall of the cell 6 can also be reduced.

It is noted that the hydrophobic section 33 may be formed, relatively to the hydrophilic section 32, by leaving the surface of the substrates 3 and 4 that are made of a material originally having hydrophobic property as is. However, it is also possible to form a hydrophobic layer (film) on the corresponding portion of the inner wall of the cell 6. By this, relatively speaking, particles having the hydrophobic surface state would more readily be unevenly distributed near the hydrophobic section 33 in the cell 6.

The regions where the hydrophilic section 32 and the hydrophobic section 33 are not limited to those described above, but may be suitably changed according to the configuration and arrangement of the electrodes 71, 72, 81 and 82.

Operation

Examples of the operation of the electrophoretic display device 1 in accordance with the present embodiment, focusing on the display control thereof, will be described below. It is noted however that the combinations of colors, charged states and surface states of the particles A-C are according to Table 2 below, as an example. Also, it is assumed that the electrode configuration and the arrangement are generally the same as those described above in FIG. 3 or FIG. 4, and the hydrophilic section 32 and the hydrophobic section 33 are provided on the inner wall of the cell 6, as exemplified in FIG. 6.

TABLE 2

Examples of Combinations of Colors, Charged States and Surface Stats of Particles

| | Particles | | |
|---|---|---|---|
| | A | B | C |
| Color | Primary Color System (R, G or B) | Complementary Color System (Cy, Ma or Ye) | White (W) |
| Charged State | Positively charged | Negatively charged | Very weakly negatively charged |
| Surface State | Hydrophilic | Hydrophobic | Hydrophobic |

It is noted that the charged state and the surface state of the particles A-C in Table 2 above may be entirely reversed. Even when they are reversed, the operation described below can be similarly achieved.

FIGS. 7A-7D show examples of the display states of cells 6, respectively. In FIGS. 7A-7D, the color of the particles A is red (R) that is an example of one of the three colors in primary color system, and the color of the particles B is cyan (Cy) that is an example of one of the three colors in complementary color system.

In FIG. 7A, a positive (+) voltage is applied to the back surface center electrode 82, and a negative (−) voltage is applied to the back surface peripheral electrode 81. It is noted that no voltage is applied to the front surface electrodes 71 and 72 (in grounded state). In this case, the positively charged red particles R are locally gathered near the back surface peripheral electrode 81 to which a negative voltage is applied, and the negatively changed cyan particles Cy are locally gathered near the back surface center electrode 81. The white particles W are dispersed, relatively, on the side of the substrate 4 which is on the viewable side. Therefore, the cell 6 displays a white color.

In FIG. 7B, a negative voltage is applied to each of the front surface electrodes 71 and 72 on the viewable side, and a positive voltage is applied to the back surface center electrode 82. The back surface peripheral electrode 81 is in no-voltage state (grounded state), but may be given a time for applying the same positive voltage applied to the back surface center electrode 82. In this case, the positively charged red particles R are locally gathered adjacent to the front surface electrodes 71 and 72 to which the negative voltage is applied, and the negatively charged cyan particles Cy are locally gathered adjacent to the back surface center electrode 82 to which the positive voltage is applied. The white particles W are distributed, relatively, adjacent to the central area between the substrates 3 and 4. Therefore, the cell 6 displays a red color.

In FIG. 7C, a positive voltage is applied to each of the front surface electrodes 71 and 72 on the viewable side, and a negative voltage is applied to the back surface peripheral electrode 81. It is noted that the back surface center electrode 82 is in grounded state, but may be given a time for applying the same negative voltage as that of the back surface peripheral electrode 81. In this case, the positively charged red particles R are locally gathered adjacent to the back surface peripheral electrode 81 to which the negative voltage is applied, and the negatively changed cyan particles Cy are locally gathered adjacent to the front surface electrodes 71 and 72 to which the positive voltage is applied. The white particles W are dispersed, relatively, adjacent to the central area between the substrates 3 and 4. Therefore, the cell 6 displays a cyan color.

It is noted that a negative voltage may be applied to the back surface center electrode 82 after a negative voltage has been applied to the back surface peripheral electrode 81. In this manner, when applying voltages with the same polarity to the different electrodes 81 and 82 that belong to the same electrode section 80, their voltage application timings may be shifted from each other, whereby the red particles R are once locally gathered adjacent to the back surface peripheral electrode 81, and then be electrophoretically moved toward and adjacent to the electrode 82 and dispersed.

In FIG. 7D, a positive voltage is applied to the front surface center electrode 72 and a negative voltage is applied to the front surface peripheral electrode 71. The back surface electrodes 81 and 82 are in non-voltage state (grounded state), respectively. In this case, the positively charged red particles R are locally gathered adjacent to the front surface peripheral electrode 71 to which the negative voltage is applied, and the negatively changed cyan particles Cy are locally gathered adjacent to the front surface center electrode 72 to which the positive voltage is applied. The white particles W are dispersed, relatively, adjacent to the central area between the substrates 3 and 4. Therefore, the cell 6 displays a mixed color of red and cyan (i.e., black).

In this manner, three kinds of particles R, Cy and W are present in each of the cells 6, whereby four types of display colors can be arbitrarily created.

Figure 7:
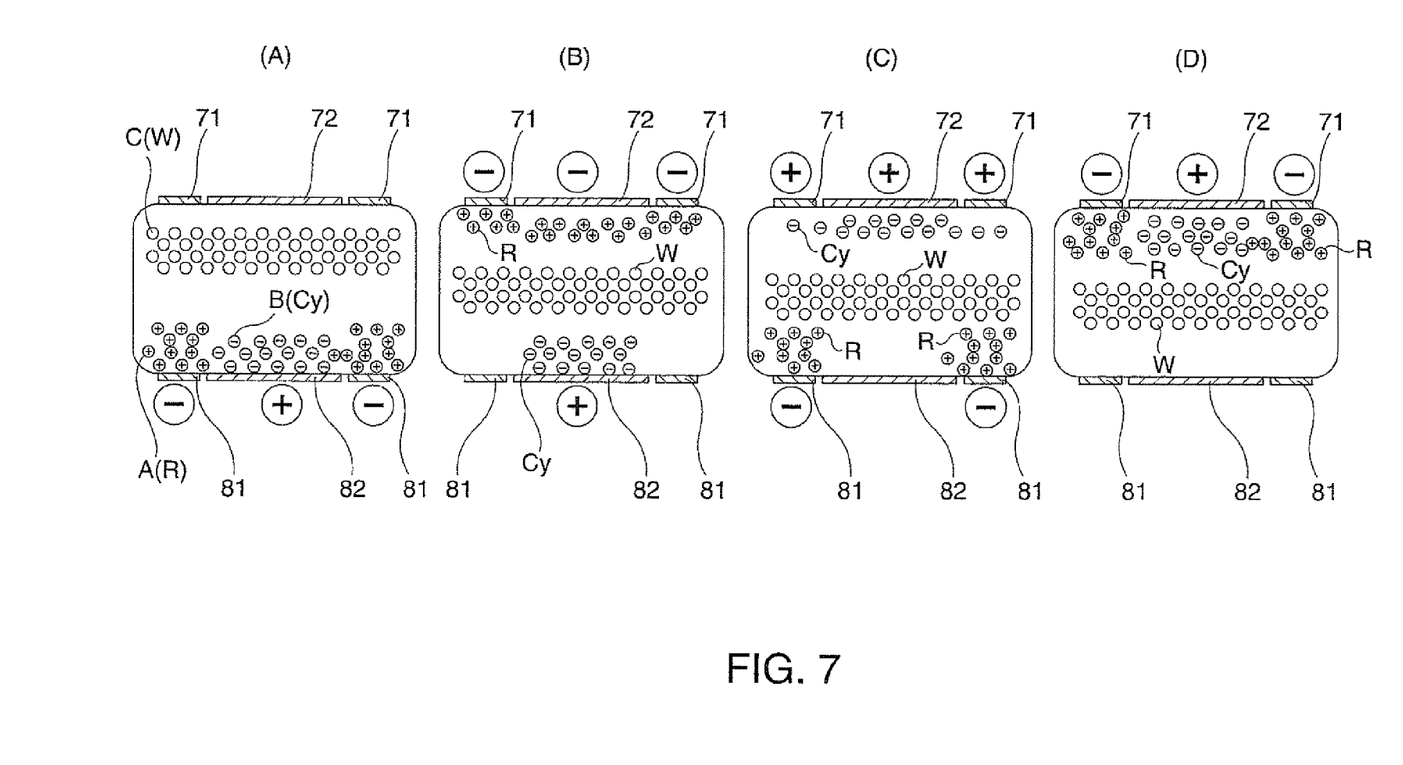
FIGS. 7A-7D are schematic partial cross-sectional views showing display states of certain cells.
Figure 8:
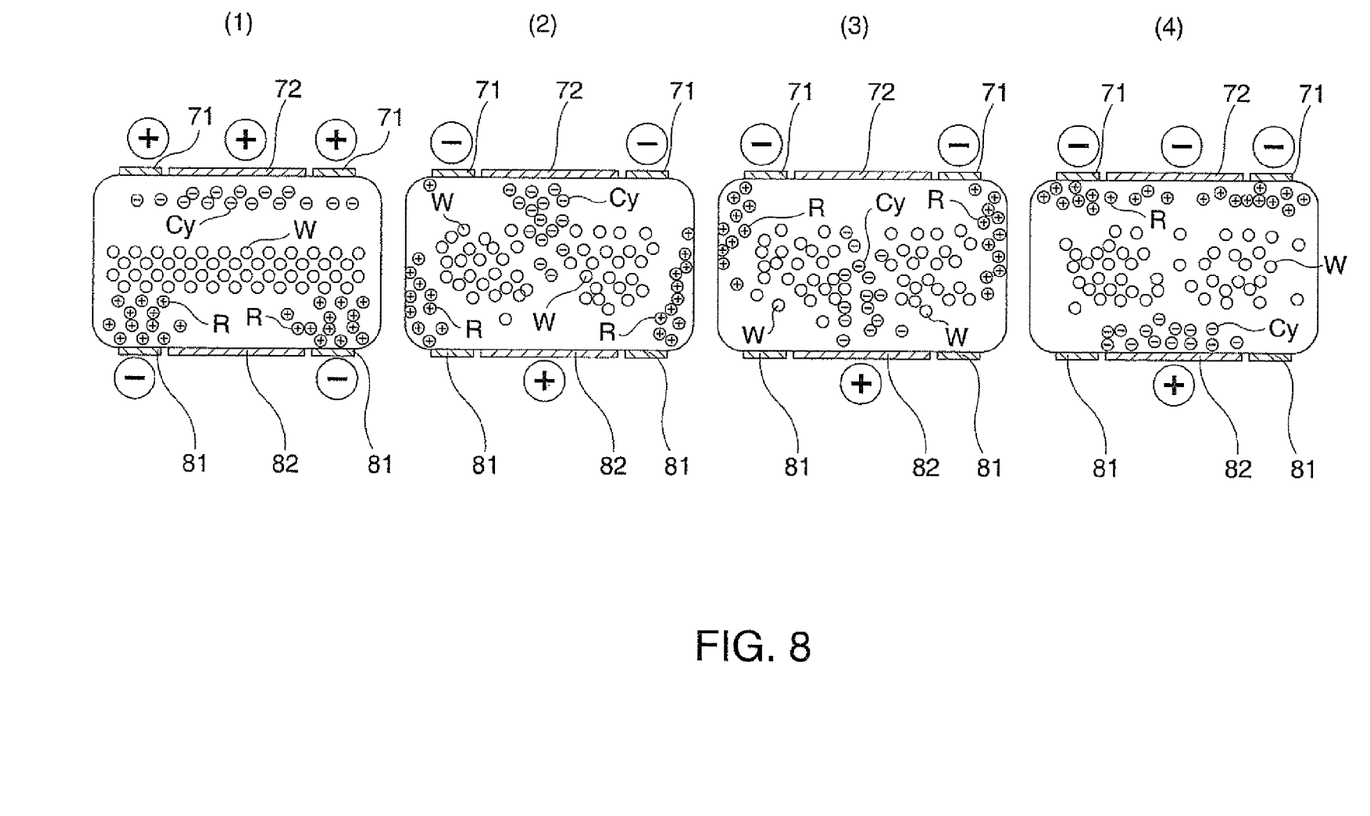
FIG. 8 shows schematic partial cross-sectional views for explaining an example of display control by an electrophoretic display device in accordance with an embodiment of the invention.

An example of state transition process of the particles R, Cy and W in the cell 6, which takes place when the display color of the cell 6 is changed from the cyan display state shown in FIG. 7C to the red display state shown in FIG. 7B, is shown in states (1)-(4) in FIG. 8.

State (1) shows a state in which the cyan color is displayed. In this instance, a positive voltage is applied to the front surface electrodes 71 and 72, and a negative voltage is applied to the back surface peripheral electrode 81.

State (2) shows a state immediately after the cyan display in state (1) has been switched to the red display. In this instance, the voltage polarity on the front surface peripheral electrode 71 is changed from positive to negative, and the voltage polarity on the front surface center electrode 72 is changed from positive to the grounded state. Also, the voltage polarity on the back surface peripheral electrode 81 is changed from negative to grounded state, and the voltage polarity on the back surface center electrode 82 is changed from grounded state to positive. In this case, the hydrophilic positively charged red particles R start electrophoretic movements along and adjacent to the hydrophilic section 32 of the cell 6 toward the front surface peripheral electrode 71 to which the negative voltage is applied. On the other hand, the hydrophobic negatively charged cyan particles Cy start electrophoretic movements toward the front surface center electrode 72 that is in grounded state, and also start electrophoretic movements toward the back surface center electrode 82 (the hydrophobic section 33) to which the positive voltage is applied. In this instance, the hydrophobic white particles W move in the dispersion medium while being pushed away by the cyan particles Cy.

State (3) shows a state after a predetermined time has elapsed since the switching in state (2) took place. The pattern of voltage polarities remains to be the same as the pattern in state (2).

State (4) shows a state in which the display color of the cell 6 has finally changed to red. Although the front surface center electrode 72 has been in grounded state in states (2) and (3), a negative voltage is finally applied to the front surface center electrode 72, like the front surface peripheral electrode 71. By this, the red particles R can be dispersed along the entire surface on the viewable side of the cell 6.

The voltage control with respect to each of the electrodes 71, 72, 81 and 82 described above can be summarized, for example, as shown in Table 3 below. However, it is assumed that the voltage value on each of the electrodes 71, 72, 81 and 82 could be any one of +V, 0 and −V.

TABLE 3

Examples of Control Voltage Applied to Each Electrode

|  | T0 | T1 (1) | T2 (2), (3) | T3 (4) |
|---|---|---|---|---|
| 71 Front surface peripheral electrode | 0 | +V | −V | −V |
| 72 Front surface center electrode | 0 | +V | 0 | −V |
| 81 Back surface peripheral electrode | 0 | −V | 0 | 0 |
| 82 Back surface center electrode | 0 | 0 | +V | +V |

Figure 9:
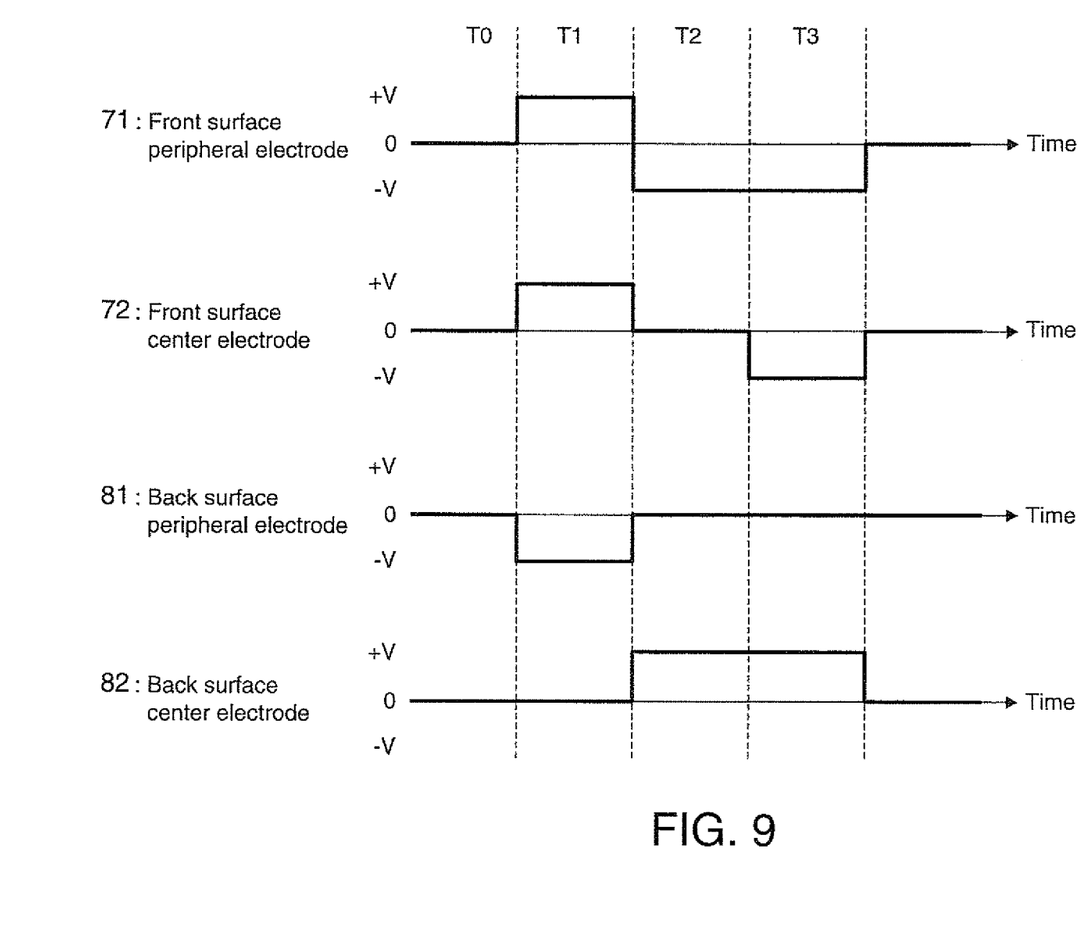
FIG. 9 shows charts showing an example of voltage waveforms used for display control of an electrophoretic display device in accordance with an embodiment of the invention.

Also, in Table 3, T0 indicates a period in which any of the electrodes 71, 72, 81 and 82 has a voltage value in grounded (0) state, T1 indicates a period of state (1) in FIG. 8, T2 indicates a period in state (2) and (3) in FIG. 8, and T3 indicates a period in state (4) in FIG. 8. In this case, temporal change in the voltage value applied to each of the electrodes 71, 72, 81 and 82 may be plotted, for example, as shown in FIG. 9. In FIG. 9, a part or all of the periods T0-T3 may be in the same time period or in different time periods, and can be set to have appropriate time periods according to the electrophoretic speed of each kind of electrophoretic particles, electrode arrangement, electrode configuration, electrode size and the like, respectively (which are similarly applicable to FIG. 10).

It is noted that, in the voltage control example described above, the negatively charged Cy particles may be once gathered to the front surface center electrode 72, and then electrophoretically moved to the back surface center electrode 82. For example, as shown in Table 4 below, in a period T2' after the period T1 described above, the front surface peripheral electrode 71, the front surface center electrode 72, the back surface peripheral electrode 81 and the back surface center electrode 82 are controlled to have voltage levels at 0, +V, −V, and 0, respectively.

TABLE 4

Examples of Control Voltage Applied to Each Electrode

|  | T0 | T1 (1) | T2' | T2 (2), (3) | T3 (4) |
|---|---|---|---|---|---|
| 71 Front surface peripheral electrode | 0 | +V | 0 | −V | −V |
| 72 Front surface center electrode | 0 | +V | +V | 0 | −V |
| 81 Back surface peripheral electrode | 0 | −V | −V | 0 | 0 |
| 82 Back surface center electrode | 0 | 0 | 0 | +V | +V |

Figure 10:
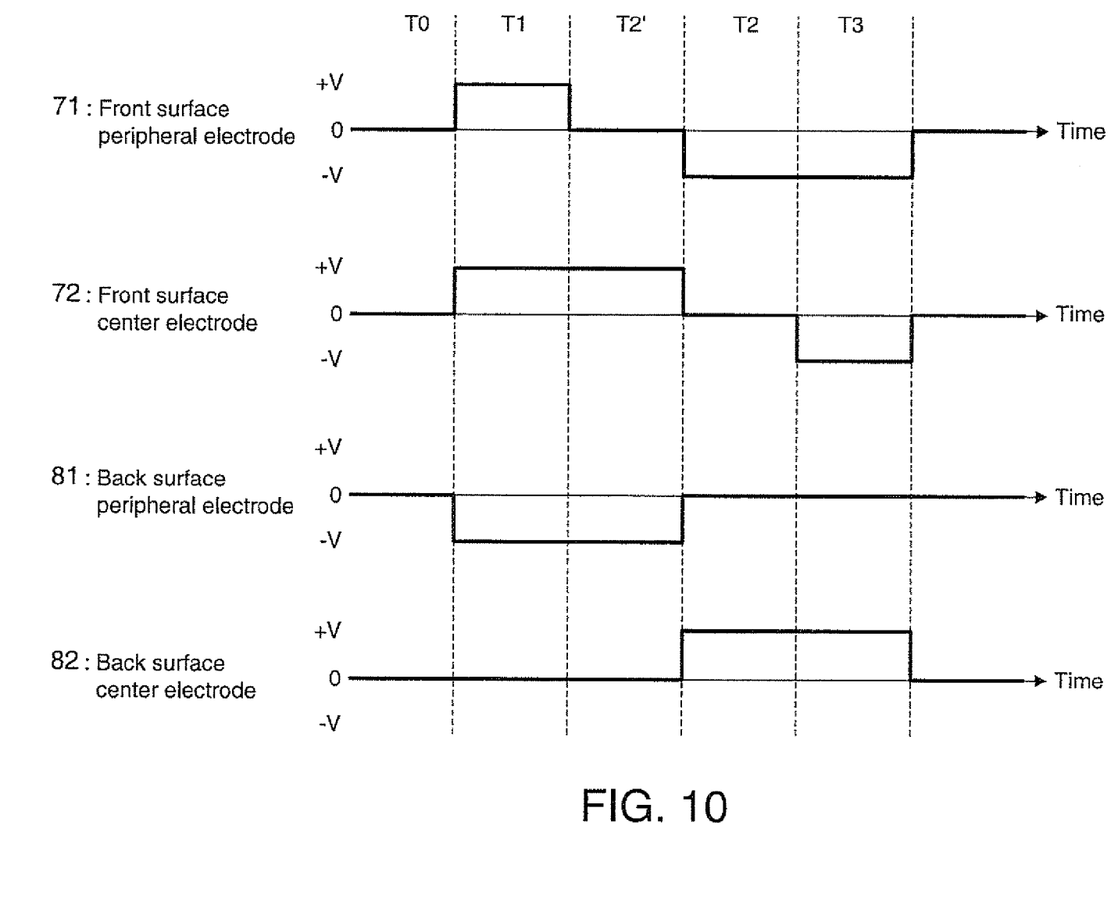
FIG. 10 shows charts showing a modified example of voltage waveforms used for display control of an electrophoretic display device in accordance with an embodiment of the invention.

As a result, in the period T2', the negatively charged Cy particles are drawn to the front surface center electrode 72 to which the voltage +V is applied and locally gathered adjacent to the electrode 72. Then, by controlling the voltages in the succeeding periods T2 and T3 in a manner similar to those shown in Table 3, the Cy particles locally gathered adjacent to the front surface center electrode 72 are drawn toward the back surface center electrode 82 to which the voltage +V is applied. Temporal change in the voltage value applied to each of the electrodes 71, 72, 81 and 82 may be plotted, for example, as shown in FIG. 10.

In the manner, during the process of electrophoretically moving specific particles from the viewable side to the opposite side, the specific particles are once gathered to the front surface center electrode 72 and then electrophoretically moved to the side of the back surface center electrode 82, whereby the spatial separation property of the specific particles with respect to other particles can be improved. It is noted that, if the step (voltage control) of gathering the electrophoretic particles once to the front surface center electrode 72, as shown in Table 3 and FIG. 9, is not executed, the display color switching speed can be improved, compared to the case where such a voltage control is executed. Therefore, when the spatial separation property of the electrophoretic particles within the cell 6 is prioritized, the voltage control exemplified in Table 4 and FIG. 10 may be executed; and when the display color switching speed is prioritized, the voltage control exemplified in Table 3 and FIG. 9 may be executed.

In a manner described above, when the red particles R and the cyan particles Cy that are charged in opposite polarities are to be moved to mutually opposite directions upon changing the display color, they can be moved by electrophoresis in paths passing through different regions (spaces) within the cell 6, respectively. Therefore, the probability of mutual collision and coupling of the red particles R and the cyan particles Cy with opposite polarities can be reduced at the time of switching the display color. As a result, the display performance of the electrophoretic display device 1 (the electrophoretic display element 2) can be improved. It is noted that the display color switching for other colors can also be realized through a similar state transition as described above. It is noted that, in the example described above, the electrophoretic paths of electrophoretic particles within the cell 6 are controlled by controlling the positive and negative phases (polarities) of the voltages applied to each of the electrodes 71, 72, 81 and 82. However, the electrophoretic paths of electrophoretic particles can also be controlled by using different values in the voltages to be applied to each of the electrodes 71, 72, 81 and 82 even in the same polarity (for example, 0V, 5V, 10V, etc.).

Modified Example

In the examples above, the invention has been described, mainly focused on the case where three kinds of particles A-C are present in each of the cells 6. However, in the case where two kinds (with opposite polarities) of particles, excluding the particles C, i.e., the particles A and the particles B are present in each of the cells 6, the control of electrophoretic paths within the cell 6 according to the charge polarities of the particles A and B can be performed, in a manner similar to the example described above.

For example, in FIG. 7 and FIG. 8, let us assume that the particles A are hydrophilic positively charged white particles, and the particles B are hydrophobic negatively charged black particles. Then, when switching between black and white in a monochromatic color display, electrophoretic paths of the white particle and the black particles may be individually controlled, whereby the rate of coupling of the two kinds of particles can be reduced.

Figure 11A:
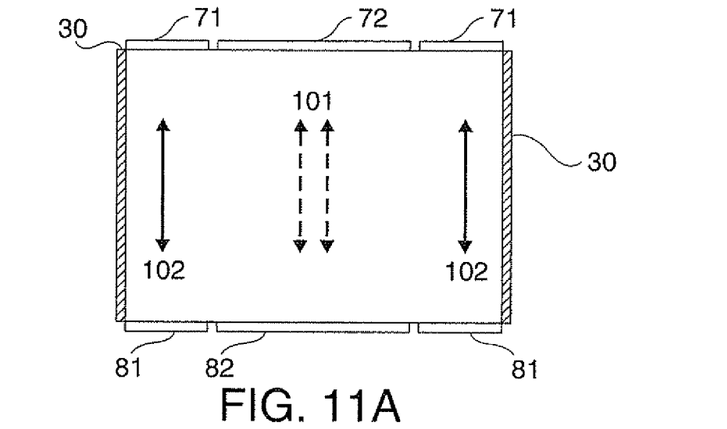
FIGS. 11A-11C schematically show variations of electrophoretic paths of electrophoretic particles performed by the display control of the electrophoretic display device in accordance with an embodiment of the invention.

For example, as shown in FIG. 11A, electric fields to be applied to the cell 6 may be appropriately controlled, whereby the white particles may be electrophoretically moved, preferentially in a central region of the cell 6 (see dotted arrowed lines 101), and the black particles may be electrophoretically moved, preferentially in a region near the side wall 30 of the cell (see solid arrowed lines 102). In this manner, by appropriately controlling the electric fields to be applied within the cell 6, the electrophoretic paths of plural types of electrophoretic particles can be individually, spatially separated from one another.

Figure 11B:
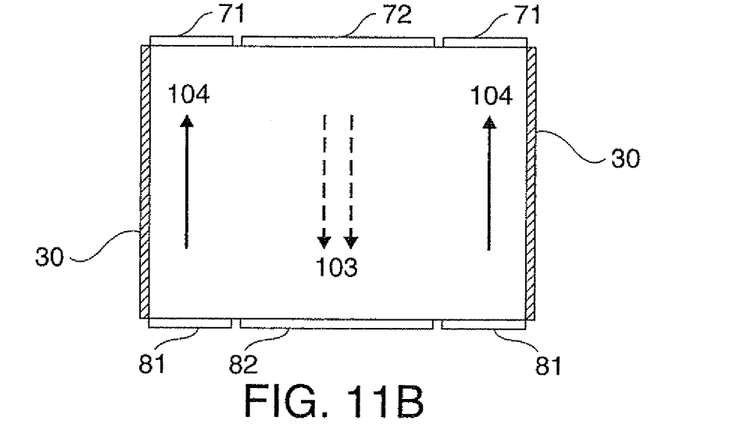

The electrophoretic paths of electrophoretic particles may be individually, spatially separated by differences in the electrophoretic directions of the electrophoretic particles. For example, the electric fields may be controlled such that, as shown in FIG. 11B, when the electrophoretic particles are moved by electrophoresis in a direction away from the viewable side, the electrophoretic particles may be moved by electrophoresis preferentially in the central region of the cell 6 (see dotted arrowed lines 103); and when the electrophoretic particles are moved by electrophoresis in a direction toward the viewable side, the electrophoretic particles may be moved by electrophoresis preferentially in a region closer to the side wall 30 of the cell 6 (see solid arrowed line 104).

Figure 11C:
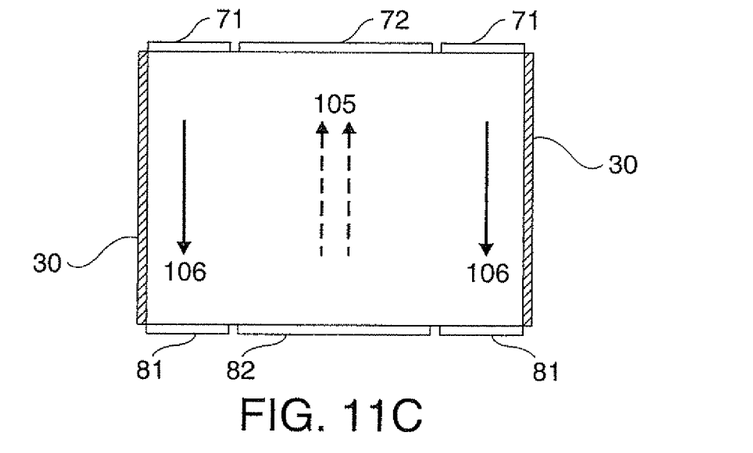

In reverse, for example, the electric fields may be controlled such that, as shown in FIG. 11C, when the electrophoretic particles are moved by electrophoresis in a direction toward the viewable side, the electrophoretic particles may be moved by electrophoresis preferentially in the central region of the cell 6 (see dotted arrowed lines 105); and when the electrophoretic particles are moved by electrophoresis in a direction away from the viewable side, the electrophoretic particles may be moved by electrophoresis preferentially in a region closer to the side wall 30 of the cell 6 (see solid arrowed line 106).

When the electrophoretic paths of electrophoretic particles can be spatially separated from one another by colors or electrophoretic directions, as described above, the hydrophilic section 32 and the hydrophobic section 33 may not be provided.

Also, a part or all of the electrodes 71, 72, 81 and 82 exemplified in FIGS. 3-5 may be further divided (miniaturized) into a group of element electrodes each having a smaller area. In this case, for example, when voltages in the same polarity are applied to a plurality of element electrodes belonging to the same element electrode group, their voltage application timings may be shifted from one another, whereby the controllability of electrophoretic paths of electrophoretic particles present in the cell 6 can be improved. Therefore, the electrophoretic particles can be more effectively moved.

Others

Various electronic apparatuses may be equipped with the electrophoretic display device 1 described above. Examples of electronic apparatuses equipped with the electrophoretic display device 1 include an electronic paper, an electronic book, a television set, a viewfinder type or monitor direct-viewing type video tape recorder, a car navigation system, a pager, an electronic notepad, an electronic calculator, an electronic newspaper, a word processor, a personal computer, a workstation, a TV phone, a POS terminal, a device equipped with a touch panel and the like.

What is claimed is:

1. A method of controlling an electrophoretic display element, the electrophoretic display element including a cell containing first electrophoretic particles charged with one of positive polarity and negative polarity and second electrophoretic particles charged with another of the positive polarity and the negative polarity, and a first electrode section and a second electrode section disposed opposite to each other across the cell in a viewing direction of the cell, the first electrode section including a first electrode and a second electrode, and the second electrode section including a third electrode and a fourth electrode, the method comprising:

individually controlling application voltages applied to the first electrode section and the second electrode section by applying a pattern of voltages to the first electrode, the second electrode, the third electrode and the fourth electrode such that all of the first electrophoretic particles electrophoretically move within the cell in a first path in a direction along the viewing direction, and all of the second electrophoretic particles electrophoretically move within the cell in a second path different from the first path in a direction opposite to the viewing direction.

2. The method according to claim 1, wherein the pattern of voltages includes at least three different voltage application states.

3. The method of claim 1, wherein the first path passes through a first space within the cell held between a pair of the first electrode and the third electrode, and the second path passes through a second space within the cell held between a pair of the second electrode and the fourth electrode.

4. The method of claim 3, wherein the first electrode is provided in a peripheral region of the first electrode section, the third electrode is provided in a peripheral region of the second electrode section, the second electrode is provided in a central region of the first electrode section, and the fourth electrode is provide in a central region of the second electrode section.

5. The method of claim 4, wherein surfaces of the first electrophoretic particles are hydrophilic, and an inner wall surface of the cell belonging to a first space is hydrophilic.

6. The method of claim 5, wherein surfaces of the second electrophoretic particles being hydrophobic, and an inner wall surface of the cell belonging to a second space being hydrophobic.

7. The method of claim 1, wherein the first electrophoretic particles being first colored particles corresponding to one of primary colors in additive color mixing or subtractive color mixing, and the second electrophoretic particles being second colored particles in a complementary relation with the first colored particles.

8. The method of claim 7, wherein the cell further includes white particles, the white particles having a polarity identical with the polarity of the second electrophoretic particles, and the white particles having a smaller charge amount than that of the first electrophoretic particles and second electrophoretic particles.

9. The method of claim 1, wherein a control of shifting voltage application timings upon applications of voltages to different electrodes belongs to the same electrode section.

* * * * *